Patented Nov. 28, 1933

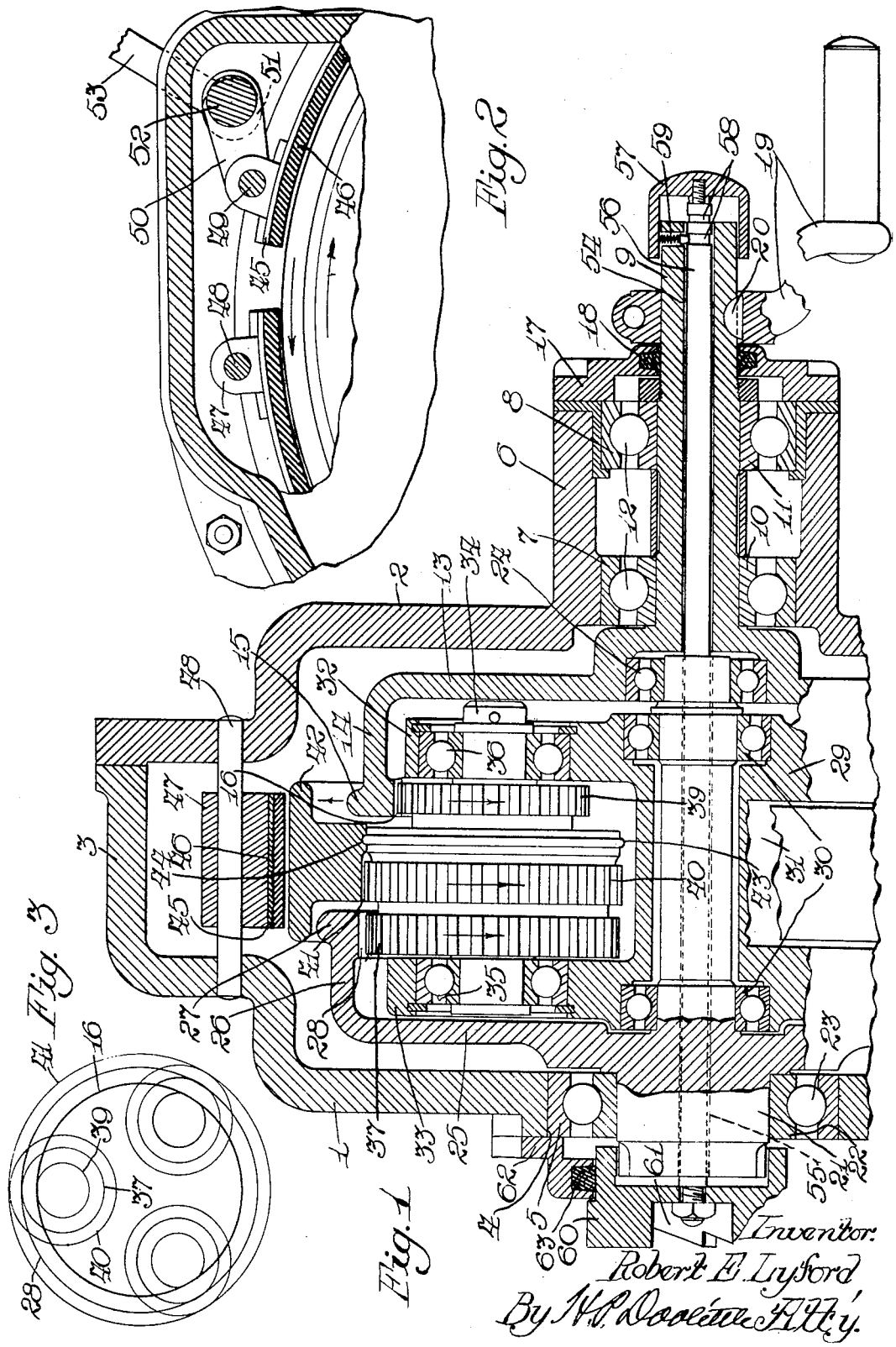
Nov. 28, 1933.   R. E. LYFORD   1,936,766
STARTER FOR INTERNAL COMBUSTION ENGINES
Filed April 26, 1930
Inventor:
Robert E. Lyford
By N. P. Doolittle Atty.

1,936,766

UNITED STATES PATENT OFFICE 1,936,766

STARTER FOR INTERNAL COMBUSTION ENGINES

Robert E. Lyford, Chicago, Ill., assignor to International Harvester Company, a corporation of New Jersey Application April 26, 1930. Serial No. 447,509

4 Claims. (Cl. 123—179)

This invention relates to an inertia starter for internal combustion engines.

The principal object of the invention is to provide an improved energy storing device particularly adaptable for starting internal combustion engines.

A more specific object is the provision of novel means for applying the inertia of a rotating system of gears.

Other objects will be apparent from the detailed description to follow.

In the drawing:

Figure 1 is a cross sectional view of a device embodying the invention;

Figure 2 is a fragmentary section showing the brake band operating mechanism; and, Figure 3 is a diagram representing the pitch diameters of the gears of the device.

In the preferred embodiment of the invention shown in the drawing, the device is enclosed in a housing consisting of sections 1 and 2. The sections have mating flanges which are substantially circular except for an offset portion 3 which provides a space inside the housing for brake anchoring and operating means which will be described hereinafter in detail. The housing sections may be rigidly attached in any way to the crank case of the engine to be cranked or to any other suitable support.

The housing section 1 is provided with a centrally located opening 4 in which a ball race 5 is fitted. The housing section 2 is provided with a hub extension 6 in alignment with the opening 4 in the section 1. The hub 6 has a pair of ball races 7 and 8 fitted therein in spaced relation with respect to each other. A shaft 9 extends through the hub extension 6. A pair of races 10 and 11 are mounted on the shaft 9 in alignment with the races 7 and 8. The balls 12 complete the bearing support for the shaft 9.

A face plate 13 integral with the shaft 9 extends radially inside the housing section 2 in spaced relation to the inner wall thereof. A cylindrical flange 14 extends axially from the periphery of the face plate 13. A reinforcing rib 15 extends radially from the outer edge of the flange 14 and an internal gear 16 is provided on the inside of the flange opposite the rib 15.

A plate 17 carrying a packing ring 18 is fitted over the shaft 9 and secured to the end of the hub extension 6 to provide an oil-tight closure. A hand crank 19 is secured against rotation on the shaft 9 by means of a key 20.

A shaft 21 extends through the opening in the housing section 1. A ball race 22 is fitted on the shaft 21 in alignment with the race 5. These two races together with balls 23 form a bearing for the outer end of the shaft 21. The inner end of the shaft 21 is rotatably mounted by a ball bearing assembly 24 formed in a recess on the face of the plate 13. The two shafts 9 and 21 are axially aligned.

An integral, circular plate 25 extends radially from the shaft 21 inside the housing and in spaced relation with respect to the inner face of the housing section 1. An integral, cylindrical flange 26 extends inwardly from the plate 25. The flange is provided with a reinforcing rib 27 and an internal gear 28 adjacent the edge of the flange.

A gear carrier 29 is mounted for rotation around the shaft 21 and concentric with respect thereto on two spaced ball bearing assemblies 30. The carrier consists of a bored cylindrical center portion 31 and radial extensions 32 and 33 integrally connected to the center portion. An orbit gear cluster is mounted for rotation on an axis parallel to the axis of rotation of the carrier 29. The gear cluster consists of a series of gears of different radii rigidly mounted with respect to each other on a bearing shaft 34. The bearing shaft 34 is rotatably mounted in the flange extensions 32 and 33 of the gear carrier on ball bearing assemblies 35 and 36. A gear 37 of the series is positioned to mesh with the internal gear 28. A second gear 39 meshes with the internal gear 16. A third gear 40 meshes with an internal gear 41 formed on an annulus 42.

The annulus 42 is mounted concentrically with respect to the gear carrier 29. It is held in alignment radially and axially by an annular bead 43 formed on a portion of the gear cluster and a cooperating groove 44 formed in a portion of the annulus. It is to be understood that a series of the gear clusters are provided arranged at equal angular distances around the axis of rotation of the carrier as shown in the diagram of Figure 3. It will be understood that three or more such assemblies would positively align the annulus 42. The line of rolling contact is on the same radius as the pitch diameter of the internal gear 41 whereby friction is reduced to a minimum.

A brake band 45 provided with a lining 46 surrounds the annulus 42 in braking relation with respect thereto. The periphery of the annulus may be widened, as shown, to provide suitable braking area. A lug 47 is secured to one end of the brake band and is pivotally mounted with respect to the housing on a pin 48. A lug 49 at the other end of the brake band is pivotally connected to a link 50. The link 50 at its other end is mounted on an eccentric 51 carried by a shaft 52 extending through the housing sections. An operating lever 53 is secured to the shaft 52.

The aligned shafts 9 and 21 are provided with axial bores 54 and 55. A push rod 56 extending through said bores is secured to a cap 57 at the crank end of the shaft 9. The cap 57 extends over the end of the shaft 9 in slidable relation with respect thereto. A pair of spaced grooves 58 near the end of the push rod are engaged by a spring pressed latch 59 providing two locked positions for said push rod. At its other end the push rod 56 is connected to a over-running jaw clutch member 60 and is adapted to impart reciprocating movement to said member. The member 60 is splined onto the end of the shaft 21 for reciprocating movement with respect thereto. A series of ratchet teeth 61 are provided on the member 60 for engagement with similar teeth on a member to be rotated. Means consisting of a annular flanged plate 62 secured to the housing section 1 and a packing ring 63 fitting around the member 60 provides an oil tight seal.

The device of this invention as described is primarily intended for storing up energy delivered to it at a slow rate and delivering the energy at a high rate. Such devices have been in use for starting internal combustion engines, particularly aeroplane engines. One of the outstanding difficulties of such devices has been to construct a clutch of a small size, which is desirable, which could transmit the great torque delivered. This device overcomes this difficulty by positively engaging the one part of a gear train with the crank shaft to be rotated and applying a brake to another portion of the gear train in such a manner that, by a differential action, the kinetic energy stored in the gear train will be delivered to the crank shaft of the engine. The mechanical definition of a differential gearing is an arrangement of gears forming an epicyclic train for connecting two shafts or axles in the same line acting on an ordinary coupling under normal conditions but permitting one shaft to revolve faster than the other when necessary.

In the diagram of Figure 3 circles represent the pitch diameters of the respective gears and are numbered correspondingly. This diagram shows three orbit gear clusters being used, this arrangement being preferable.

In the operation of this device, pressure is applied to the cap 57 to engage the over-running jaw clutch member 60 with a mating member, not shown, mounted on the crank shaft of an engine to be rotated. The brake lever 53 is set with the brake band in non-engaging position. Torque is then applied to the shaft 9 by means of the crank 19.

The internal gear 16 applies pressure on the gear 39. As the gears 41 and 37 are rigid with respect to the gear 39, torque is also applied to these gears and all of the gears must rotate together. As the member 26 and the internal gear 28 carried thereby is substantially fixed when the member 60 is engaged, the gear 37 must roll around the inside of the gear 28. As the internal gear 16 is of smaller diameter than the internal gear 28, the gear cluster will run ahead in direction of cranking losing in each of its orbits about the internal gear 28 a distance equal to the difference in the circumference of the pitch diameters of the gears 28 and 16. As a result, the gear cluster will travel at comparatively high speeds about its own axis and likewise its carrier 29 will rotate at a speed considerably higher than the speed of the crank 19.

The gear system of this invention is a combination of two epicyclic gear trains, such as illustrated in Kent's Handbook of Mechanical Engineering, page 1659 (1914 edition, Figure 15). The formula for the velocity of the gear carrier and the freely rotating gear is as follows:

$$V_n = V_r \times (1 - (fm \div sn)).$$

In this formula $V_n$ equals the angular velocity of the freely rotating gear; $V_r$ equals the angular velocity of the internal gear carrier; "$f$" equals the number of teeth in the fixed gear; "$s$" equals the number of teeth in the orbit gear meshing with the fixed gear; "$n$" equals the number of teeth in the freely rotating gear; "$m$" equals the number of teeth in the orbit gear meshing with the freely rotating gear.

For an example, if the number of teeth which might be in gears having about the same relative proportion as the gears illustrated are estimated, an example may be worked out showing the relative speeds of the different elements. For example, let us suppose that "$f$" equals 120; "$s$" equals 40; "$n$" equals 104; "$m$" equals 34. By substituting in the equation it will be found that the ratio between $V_n$ and $V_r$ is as 1 to 50. In other words, the gear carrier 29 as illustrated will rotate 50 times as fast as the crank 19 in the same direction. The gear cluster rotates as much faster as the ratio of the number of teeth in the gear 28 to the number of teeth on the gear 37, minus 1. As the gear cluster rotates about its own axis in reverse direction as compared to the carrier it loses a revolution for each revolution of the carrier. In the example given, the gear cluster would rotate twice the speed of the carrier. If the crank were rotated at 100 R. P. M., the carrier would rotate at 5,000 R. P. M., and the gear cluster would rotate 10,000 R. P. M. It will be seen that at these speeds a great amount of inertia will be stored in the rotating gear system. Ball bearings are used throughout the device to minimize the effects of friction.

The same formula may be applied to find the speed of the internal gear 41 relative to the braking member 42. Let us assume that the gear 40 has 41 teeth and the gear 42 has 121 teeth. Substitution in the formula gives the ratio that the angular velocity of the braking member divided by the velocity of the gear carrier equals .016. That is, if the gear carrier is traveling 5,000 R. P. M., the braking member will be rotating 80 R. P. M. in a reverse direction.

After an angular velocity has been attained sufficient to store up the required kinetic energy or inertia in the rotating system, the brake is applied to the annulus 42 with sufficient force to lock said member against rotation. This member then becomes the fixed member and substitution in the formula shows that the velocity of the internal gear 28, which becomes the moving gear when the annulus 42 is fixed, will be equal to .0163 times the angular velocity of the gear carrier. If the gear carrier is traveling 5,000 R. P. M., the gear 28, and likewise the over-running jaw clutch member, will be rotated at 81½ R. P. M. in the original cranking direction.

When this device is to be used for cranking and starting an internal combustion engine, it is necessary to disengage the device as soon as the engine is rotating faster than the torque delivering member 60. This is taken care of automatically, due to the construction of the device. The ratchet teeth on the engaged member, not shown, run ahead of the teeth 61 on the member 60 and push it axially out of engaging position. The push rod is held with the ratchet teeth out of engagement by the seating of the spring pressed latch 59 in one of the grooves 58.

A feature inherent in this device due to its construction is that the complete gear system may be rotated as a unit. For turning over an engine with low or released compression, the member 60 may be turned the same rate as the crank 19, the entire assembly rotating as a unit. This feature is also desirable in the event of back firing during normal operation. The servo type brake will have a tendency to release and allow the entire assembly to rotate in a reverse direction. In starting to put the gear train in motion it may be found desirable to rotate the train as a unit before locking the ratchet teeth in order to put the gears in operation against the action of static friction, which may freeze them in position.

A hand crank has been shown as that is a preferred means for operating the device of the invention. An electric motor or other means may be used, however. As a motor operates at high speed with low torque compared to hand cranking, it would probably be found desirable to attach a gear to the carrier 29 and drive the carrier from the motor by means of such a gear. In either hand or motor operation the application of power can be continued after engagement of the brake to supplement the energy stored up in the rotating parts.

Although applicant has illustrated and described in detail an epicyclic gear train of a particular construction, it is to be understood that he contemplates as his invention any system of gears whereby one gear of the system may be positively locked to a member to be rotated before energy is applied to the remaining gears of the system. For example, differential or planet gear trains of any well known type could be employed with similar results.

What I claim as my invention is:

1. An inertia device comprising a gear train made up of a plurality of gears constantly in mesh, means for mounting said gears whereby two gears of the train rotate on fixed axes, means for mounting other gears of the train whereby either of said first named gears may be held in a fixed position when the other of the two gears is rotating, means for initially locking one of said gears to a shaft to be rotated against a high torque, means for rotating the gear train with some of its component gears rotating with a high angular velocity whereby considerable kinetic energy is stored up in the gear train, and means for locking the other gear rotating on a fixed axis against rotation whereby the major portion of the energy is delivered to the initially fixed member.

2. An inertia starter comprising a system of gears having a differential gear action intermediate certain of the gears, means for connecting a gear on one side of the differential to a member to be rotated against high torque, means for locking a gear on the other side of the differential, and means for rotating the gear system prior to the application of the locking means whereby energy is stored in the system.

3. An inertia device comprising two rotatable gears, an epicyclic gear mounted between said gears and having portions meshing with each of said gears, a carrier for said epicyclic gear, means for initially positively engaging one of said rotatable gears with a shaft to be rotated against a high torque, means for rotating the gear carrier at high angular velocity, and means for locking the second rotatable gear against rotation when sufficient energy has been stored in the gears to rotate said shaft.

4. An inertia starter comprising a rotatable member, means for engaging said member with a shaft to be rotated, an internal gear carried by said rotatable member concentric with respect to its axis of rotation, a gear carrier mounted for rotation on the same axis as said member, an orbit gear cluster mounted on said carrier, a gear of said cluster adapted to mesh with said internal gear, a braking member mounted for rotation on an axis concentric with respect to the gear carrier and having an internal gear adapted to engage a gear of the gear cluster, the internal gear on the braking member and the first named rotatable member being of different radii, means for initially rotating the gear carrier at high angular velocity, and means for subsequently locking said braking member whereby the inertia of the moving parts is transmitted to the rotatable member.

ROBERT E. LYFORD.